United States Patent [19]
Hutchison et al.

[11] Patent Number: 5,894,517
[45] Date of Patent: Apr. 13, 1999

[54] HIGH-SPEED BACKPLANE BUS WITH LOW RF RADIATION

[75] Inventors: Jerry Hutchison, Littleton; William Melaragni, Billerica, both of Mass.

[73] Assignee: Cabletron Systems Inc., Rochester, N.H.

[21] Appl. No.: 08/657,583

[22] Filed: Jun. 7, 1996

[51] Int. Cl.⁶ .................................. H04L 9/00; H04K 1/10
[52] U.S. Cl. .................... 380/9; 380/6; 380/33; 380/49; 380/59
[58] Field of Search ................ 380/9, 46, 49, 380/59, 6

[56] References Cited

U.S. PATENT DOCUMENTS

| | | | |
|---|---|---|---|
| 4,563,546 | 1/1986 | Glitz | 380/49 |
| 4,932,057 | 6/1990 | Kolbert | 380/6 X |
| 5,036,542 | 7/1991 | Kehoe et al. | 380/6 X |
| 5,165,098 | 11/1992 | Hoivik | 380/6 X |
| 5,297,201 | 3/1994 | Dunlavy | 380/6 |

*Primary Examiner*—Bernarr E. Gregory
*Attorney, Agent, or Firm*—Wolf, Greenfield & Sacks, P.C.

[57] ABSTRACT

A method and apparatus for substantially reducing electromagnetic radiation from a backplane used to interconnect multiple communication modules. Data signals to be transmitted onto the backplane are first scrambled using a pseudorandom code sequence, to reduce energy peaks in the radiation spectrum and to spread energy over a wider bandwidth. Signals received from the backplane are descrambled using an identical pseudorandom code sequence. Data rate synchronization is provided by recovery of a data clock signal from the received scrambled signals, and data frame synchronization is provided by transmitting data frame headers as non-scrambled data. At a receiver module, the frame headers are detected and used to reset the descrambling operation.

19 Claims, 6 Drawing Sheets

HIGH-SPEED BACKPLANE BUS WITH LOW RF RADIATION

BACKGROUND OF THE INVENTION

This invention relates generally to techniques for the interconnection of electronic equipment modules and, more particularly, to the interconnection of communication equipment modules through a backplane. A common technique for interconnecting electronic equipment modules is by means of a set of interconnection conductors placed over a common return path, usually referred to collectively as a bus. Multiple equipment modules are connected to the bus, usually in a removable fashion, and a standard connection interface is defined such that each module makes electrical contact with appropriate conductors forming the bus. The principal function of the bus is to carry data or other signals from one module to another, or to distribute data from one module to multiple other modules, or to distribute non-data signals required for normal operation, such as power or clocking signals. In a configuration familiar to personal computer users, a bus may be formed in a "motherboard," on which other components are also mounted, and into which various "daughterboard" circuit cards are plugged. An interconnecting bus may also be referred to as a "backplane," because the individual conductors of the bus are formed as metal traces on the rear face of a circuit board, such as the motherboard used in personal computers. The backplane is formed as a collection of signal conductors over a common reference plane. A signal's return current is carried in the reference plane, making this an unbalanced transmission system. The most common example of this is called a microstrip transmission line. A backplane commonly provides access to the signal conductors with the use of one or more connectors.

A well known problem associated with electronic equipment is electromagnetic radiation. The degree to which electronic equipment emits electromagnetic radiation is stringently regulated by various governmental agencies. In the United States, the Federal Communications Commission (FCC) promulgates regulations to limit the amount of radiation emitted from electronic equipment, and to provide for routine testing of manufactured products to ensure compliance. Similar administrative bodies perform the same function in Canada, Europe and other parts of the world. Electromagnetic radiation is undesirable because it may interfere with radio and television transmission through the atmosphere or with the operation of other nearby electronic equipment, and it may have harmful physiological effects. In general, there are two types of solutions for reducing electromagnetic radiation from electronic equipment: those that increase shielding around the equipment and those that control the frequency spectrum of signals responsible for the emission of radiation. A basic shielding technique is to place the equipment in encompassing metal enclosures and install radio-frequency (rf) gaskets to minimize emissions through necessary openings in the enclosures. The encompassing conductive enclosure forms a Faraday shield which reduces radiated power by forcing the electric field component of an electromagnetic wave to be nearly zero at the surface of the conductor, thereby blocking wave propagation. Shielding effectiveness is enhanced by higher conductivity (for example, a copper shield is more effective than a steel or aluminum shield), and rendered less effective by any holes or slots in the surface of the shield. At higher frequencies a shield is less effective as conductivity is decreased due to the skin effect, and as the wavelength of the energy to be blocked approaches the dimension of any holes or slots in the shield. Although shielding with enclosures of this type can be quite effective, the resulting package is bulky and relatively expensive. Shielding may be further improved with the use of individually shielded conductors, i.e., coaxial cables. The principal difficulty with this approach is that it is costly to implement for every signal in a backplane. Backplanes often include 30–50 conductors and typically 10–16 connectors to the backplane, known as "drops." Replacing each conductor of the backplane with a coaxial cable would be prohibitively expensive.

A widely used shielding compromise involves the use of "modular" shields, wherein the backplane and each connected circuit module have separate shields. Modular shields are cost-efficient, but with the sacrifice that non-ideal shielding is provided, i.e., not as good as with the use of a single, encompassing conductive enclosure.

There is a direct relationship between the spectral content of data-carrying signals in electronic equipment and the electromagnetic interference (EMI) performance of the equipment. At lower baud rates there is less energy at the higher frequency ranges of the spectrum. Specifically, radiated power from a data-carrying conductor is reduced if the baud rate of the signal is lowered. A significant disadvantage that necessarily follows from reducing the baud rate is that the number of signal-carrying conductors must be increased if the same volume of data is to be transmitted. Control of radiated emissions can also be achieved by the use of a balanced transmission system where two conductors are twisted together and wherein the current carried in one conductor is returned by the other. Balanced transmission systems employing twisted conductors achieve EMI reduction by the tight, symmetric twisting of the conductors, which causes cancellation in the radiated fields. The obvious disadvantage of this technique is the requirement for two conductors per signal.

There is a well understood relationship between electromagnetic emission levels and the physical size of a circuit, acting as an antenna, that is responsible for the emissions. Specifically, larger circuits produce greater electromagnetic emissions. For example, in computer design the use of high frequencies is often limited to a small spatial area, such as that of a microprocessor chip, thus limiting the radiated emission levels. This option is not normally available in backplane design, because the backplane has to accommodate multiple plug-in modules, usually in the form of circuit boards. Therefore, as the need for higher bus speeds increases, there is an accompanying need for an alternative technique for reducing electromagnetic emissions.

It has been recognized in other contexts that the spectral content of data signals can be spread over a wider bandwidth, but with lower energy in each spectral increment, if the signals are modulated or "scrambled" with pseudorandom code. A pseudorandom code is one that changes in an apparently random fashion but actually repeats its sequence of changes over a relatively long time cycle. A pseudorandom code can be regenerated for use in a descrambling operation that recreates the original data signal. Scrambling techniques of this general type are used, for example, in SONET (Synchronous Optical Network), and in various satellite communication systems. Advantages of these techniques include the ability to recover clock signals from the received scrambled signals, because the energy of the data signals is distributed more uniformly across the frequency spectrum, and the reduction of radiated energy at any particular narrow frequency band.

It will be appreciated from the foregoing that there is still a need for improvement in the field of backplane design for interconnection of electronic equipment, especially communication equipment. In particular, an alternative technique is needed to reduce electromagnetic emissions from electronic equipment incorporating backplanes. The present invention satisfies this need.

SUMMARY OF THE INVENTION

The present invention resides in apparatus, and a related method for its use, for reducing electromagnetic emission from backplanes carrying high-frequency signals, for the purpose of meeting regulatory requirements without adding costly shielding or reducing data handling capacity. Briefly, and in general terms, the apparatus of the invention comprises a backplane having at least one signal conductor for transmission of data, a common return path, at least one bus transmitter module for transmitting data signals onto a backplane conductor, at least one bus receiver module for receiving data signals from the backplane conductor, a scrambling device associated with the bus transmitter module, for scrambling data signals before transmission onto the backplane conductor, and a descrambling device associated with the bus receiver module, for descrambling data signals received from the backplane conductor. The scrambled data transmitted along the backplane conductor results in lower energy electromagnetic radiation peaks because the scrambled data signals have their energy spread more uniformly across the frequency spectrum. More specifically, the scrambling device operates in synchronism with the clock signal of data to be transmitted. The apparatus may also include a clock recovery circuit associated with the bus receiver module, for recovering a data clock signal from the received scrambled data signals. The bus receiver module also includes circuitry for detecting the start of a received data frame and generating a frame pulse therefrom. The apparatus in its preferred form also includes a parallel-to-serial converter associated with the bus transmitter module and a serial-to-parallel converter associated with the bus receiver module, wherein data signals are converted to a serial stream before scrambling, transmission, receiving and descrambling, and are then converted back to parallel form.

In terms of a method, the invention comprises the steps of converting data, if necessary, to a serial input data stream, scrambling the serial input data stream by combining the stream with a pseudorandom code sequence, transmitting the scrambled data stream onto a backplane conductor, receiving the scrambled data stream from the backplane conductor, descrambling the received scrambled data stream, and converting, if necessary, the descrambled data stream back into parallel form. The scrambled data stream results in substantially reduced electromagnetic emissions from the backplane conductor. The method may also include the steps of recovering a data clock signal from the scrambled data stream received from the backplane conductor, detecting a frame boundary in the received scrambled data stream, using the frame boundary to provide a descrambler reset signal, and using the recovered clock signal to control operation of the descrambler.

More specifically, the scrambling step includes generating a pseudorandom code sequence, and combining the pseudorandom code sequence with the input data stream. Similarly, the descrambling step includes generating a pseudorandom code sequence identical with the one generated in the scrambling step, and combining the pseudorandom code sequence with the received scrambled data stream, to recover the input data stream.

It will be appreciated from the foregoing summary that the present invention represents a significant advance in the design of systems incorporating backplanes. In particular, the invention provides for substantially reduced electromagnetic emission while still maintaining a high data transmission rate. Other aspects and advantages of the invention will become apparent from the following more detailed description, taken in conjunction with the accompanying drawings.

DESCRIPTION OF THE PREFERRED EMBODIMENT

Figure 1:
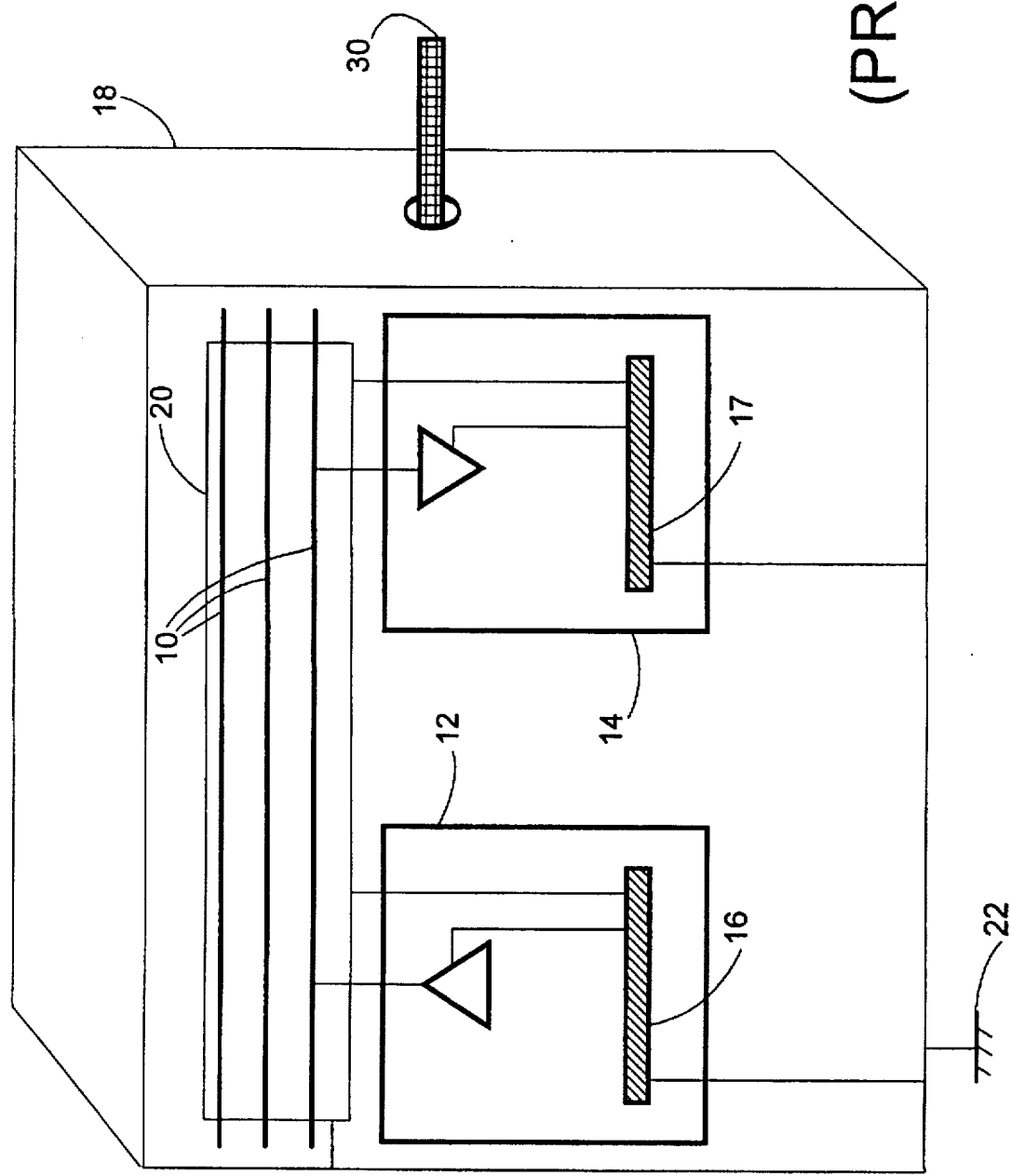
FIG. 1 is a block diagram depicting a prior art technique for shielding backplane structures.

As shown in the drawings for purposes of illustration, the present invention pertains to a technique for reducing electromagnetic radiation from a backplane used to interconnect multiple electronic modules for the principal purpose of transmitting data signals originating from one of the modules. Backplanes of this general type may be found a number of environments, e.g., in computers, for interconnecting various hardware modules, and in computer networks, for interconnecting multiple communication modules. As computer networks have grown in size and complexity, so has the need for higher data transmission rates through backplanes of communication hubs. Unfortunately, the higher data transmission rates have been accompanied by increased levels of electromagnetic radiation. The Federal Communications Commission (FCC), and other national and regional organizations in other countries, regulate such emissions by requiring that maximum radiation levels not be exceeded in any bandwidth across a designated frequency band. These requirements are difficult or impossible to meet in high-frequency backplane equipment, without the use of bulky and expensive shielding.

FIG. 1 shows diagrammatically how shielding is conventionally employed in a backplane configuration of the prior art. A backplane is indicated by three conductors (reference numeral 10), and individual modules are indicated at 12 and 14. The module 12 transmits data onto the backplane conductors 10 and the module 14 receives data from the backplane conductors. Each module 12, 14 has a reference plane 16, 17, respectively, and the entire system including the backplane conductors 10 and modules 12 and 14, is enclosed in a metal chassis or housing 18 that provides the system reference plane, indicated at 20. Connection between the system reference plane 20, housing 18, and the earth 22 is often provided for safety reasons. This connection is usually made through a power line supplying power to the system. Communication with other systems outside the housing 18 is made through one or more inter-system cables, one of which is shown at 30. This approach to minimizing electromagnetic radiation requires a relatively bulky and costly housing 18 of steel or similar material. Moreover, because the modules 12 and 14 are not individually shielded, they have to remain in the housing 18 during operation, making their removal and replacement awkward and inconvenient.

Figure 2:
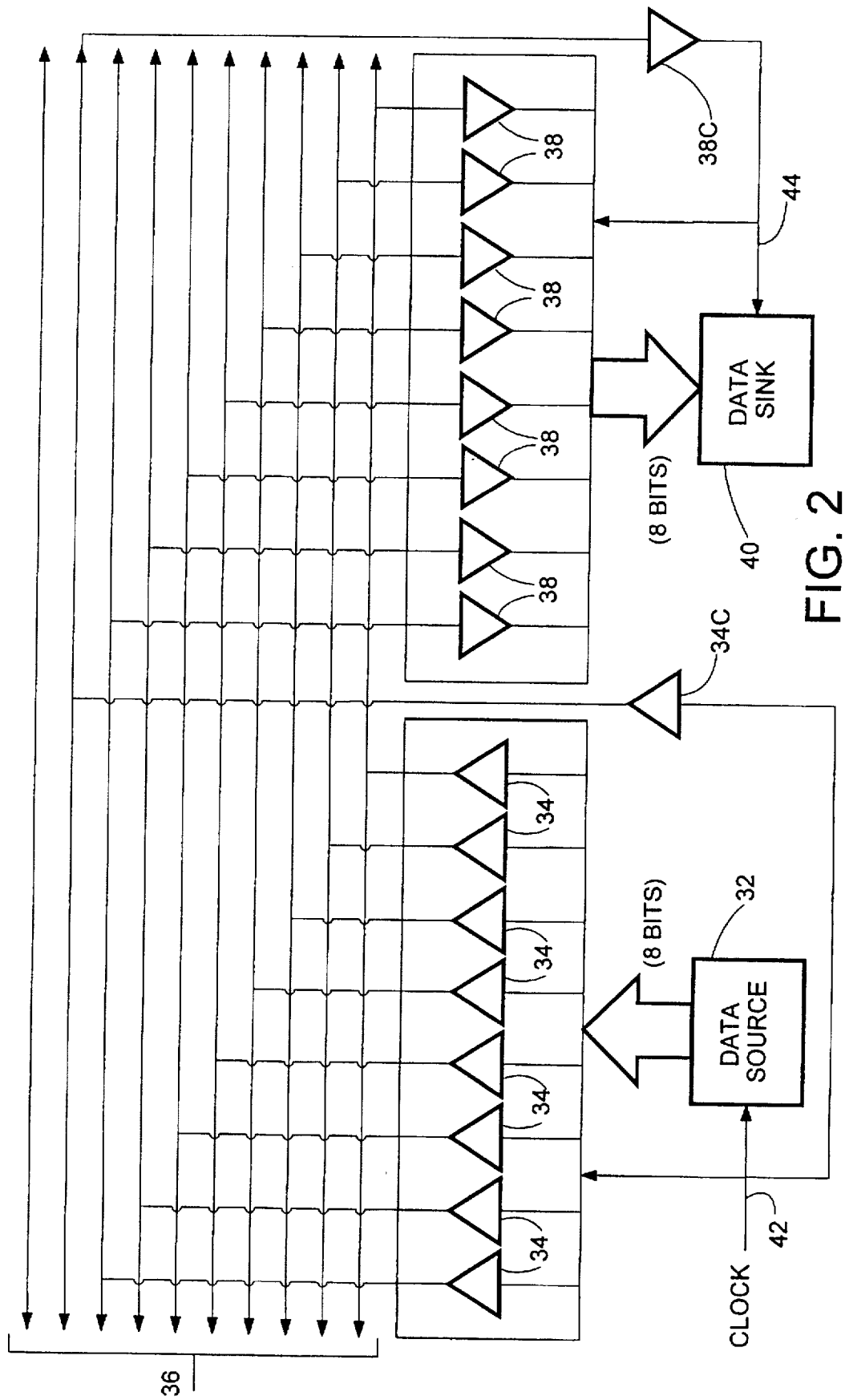
FIG. 2 is a block diagram depicting a prior art technique for reducing electromagnetic radiation from a backplane structure.

FIG. 2 shows an additional approach to reducing electromagnetic radiation, often used in conjunction with FIG. 1 to allow less costly and cumbersome shielding. Data signals are transmitted at a lower data rate along each conductor of a backplane, to reduce emissions, but a larger number of backplane conductors and associated circuits are required. As shown in the figure, data from a data source 32 are fed eight bits at a time into a set of eight transmit circuits, indicated at 34. Each of the transmit circuits 34 sends data to a separate backplane conductor, indicated at 36. Data signals are received from the backplane conductors 36 by eight receive circuits 38, which are connected to eight separate conductors of the backplane. The received signals are sent to a data sink 40 for further processing. Clock signals, indicated as being present on line 42 to the data source 32 and the transmit circuits 34, and on line 44 to the data sink 40 and the receive circuits 38, control the timing of transmitted and received data signals. A typical clock signal is a 19.44 MHZ square wave, and a typical data rate is eight times the clock rate, or 155.52 Mbits/sec. The clock signal on line 42 is also supplied to a clock transmit circuit 34C, which couples the clock signal to one of the backplane conductors 36. The clock signal is recovered from the backplane by a clock receive circuit 38C, which outputs the recovered clock signal over line 44 to the data sink 40.

The drawbacks of the technique shown in FIG. 2 are that data rates are still limited, related to the quality and effectiveness of the encompassing shield, and there is a requirement for multiples of most components, including the backplane conductors and the transmit and receive circuits.

Figure 3:
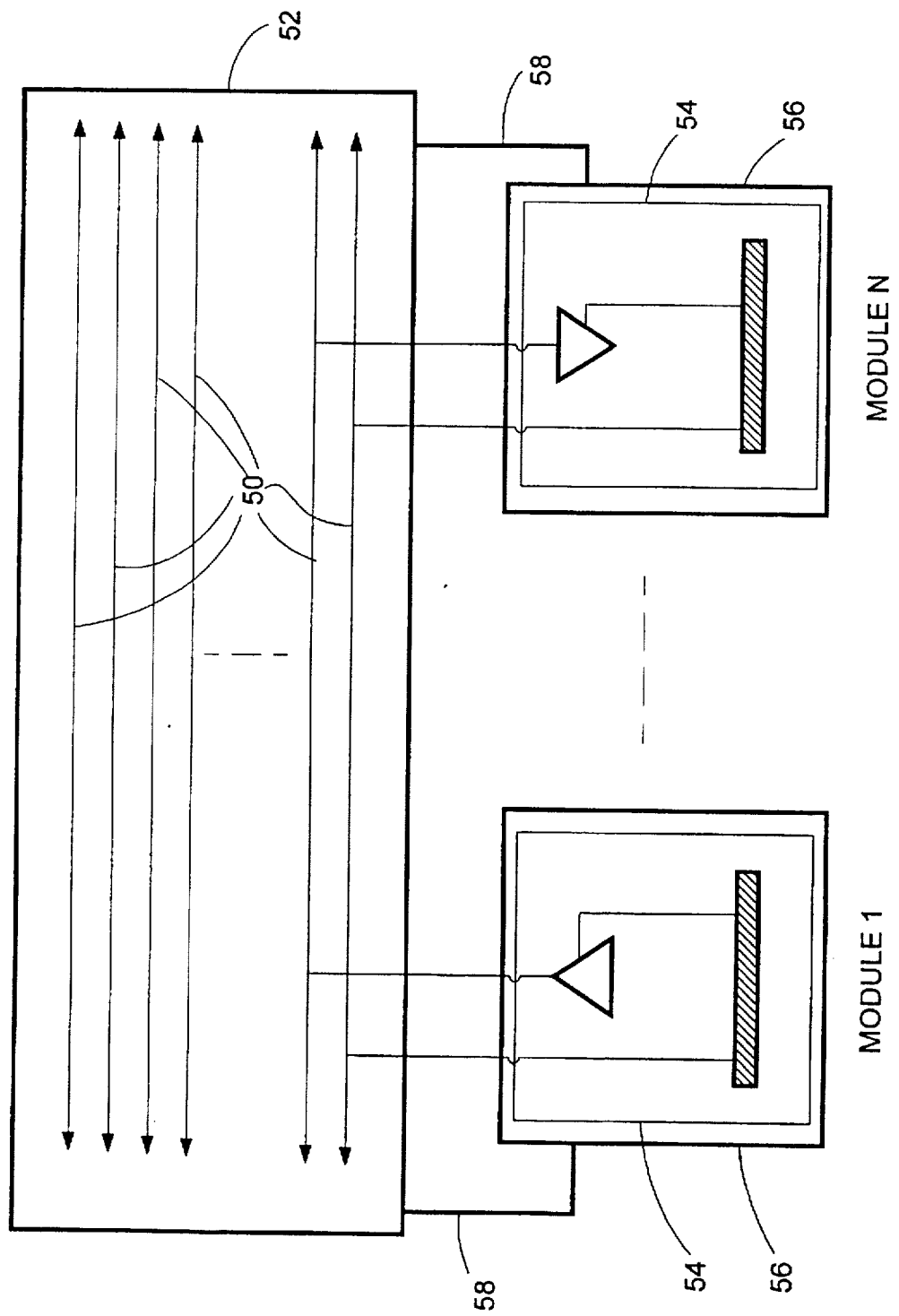
FIG. 3 is a block diagram depicting another prior art technique for shielding backplane structures, using modular shielding.

FIG. 3 shows another prior art approach to reducing electromagnetic radiation, known as modular shielding. A backplane structure, with multiple parallel conductors 50, is contained in its own shielded enclosure 52. Multiple modules 54, two of which are shown, have separate shielded enclosures 56. The backplane enclosure 52 and the module enclosures 56 are typically connected by conductive links, as indicated at 58. Modular shielding necessarily has increased inductance, contact resistance, and even gaps to permit the interconnection of the modules, and is not as effective as a simple, encompassing shielded system, such as the one depicted in FIG. 1. The design of FIG. 3, adopted for its convenience factors, was originally limited to applications using relatively low backplane signaling rates due to the need to control electromagnetic radiation without increasing packaging costs. Those costs can now be greatly exceeded.

In accordance with the present invention, data signals transmitted onto a backplane are first scrambled with a pseudorandom code, to spread the transmitted energy in the data signals over a broad band of frequencies, and to reduce the energy radiated from the system in any bandwidth in the frequency band to an acceptable level. Signals received from the backplane are descrambled using the same pseudorandom code that was used to scramble the signals. Thus, data signals can be transmitted at a high data rate without the need for additional shielding of the backplane to reduce electromagnetic emission. Moreover, data clock rates in excess of 150 MHZ can be used, and the backplane can be designed as a relatively dense wire-over-ground structure.

Figure 4:
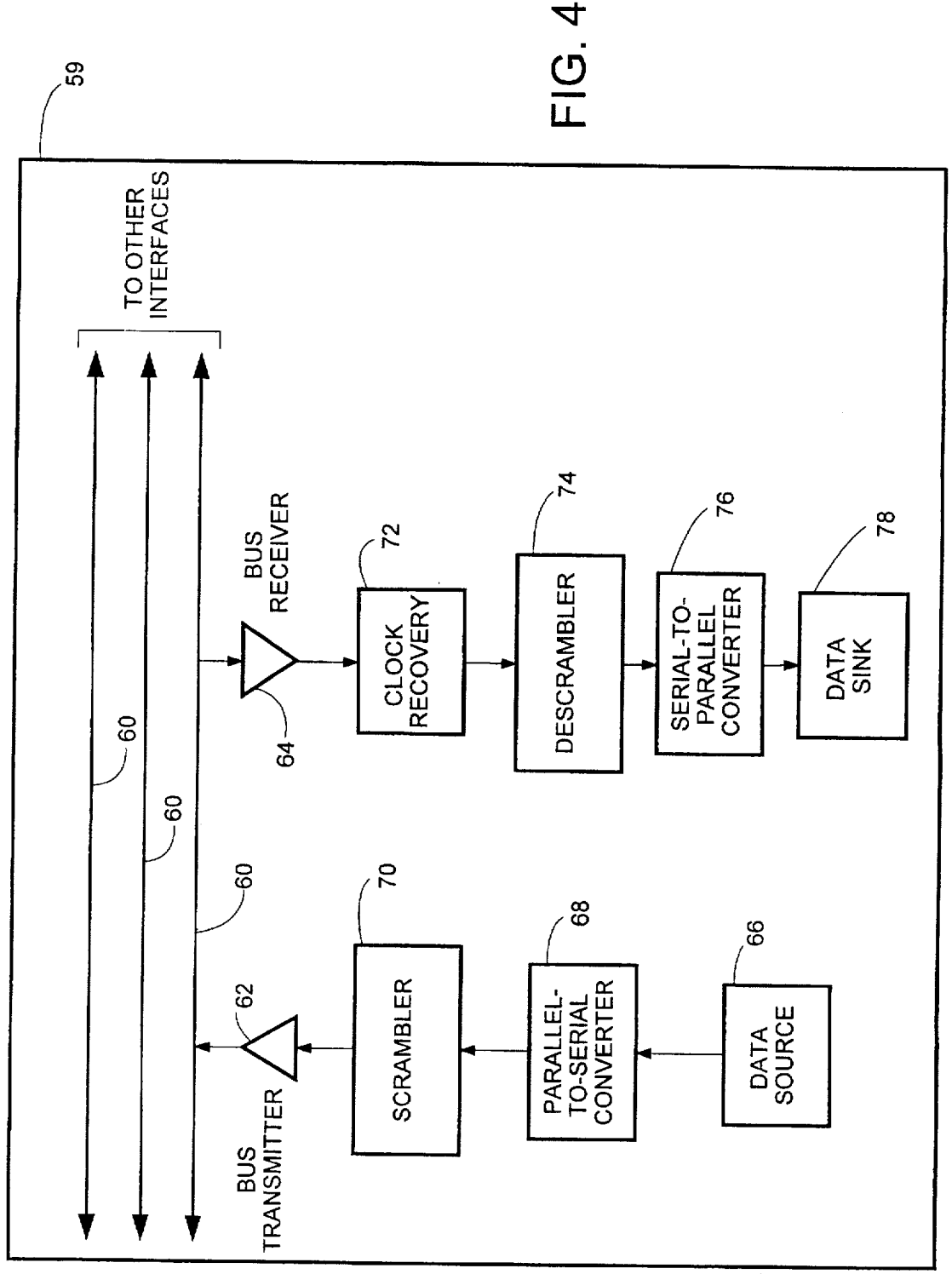
FIG. 4 is a block diagram of the present invention, showing scrambling of signals transmitted onto a backplane and descrambling of signals received from a backplane.

A backplane architecture in accordance with the invention is indicated by reference numeral 59 in the block diagram of FIG. 4 and includes multiple backplane conductors 60, only three of which are shown, multiple bus transmitter circuits 62, only one of which is shown, and multiple bus receiver circuits 64, only one of which is shown. Associated with each bus transmitter 62 is a data source 66, a parallel-to-serial converter 68 and a scrambler 70. Associated with each bus receiver 64 is a clock recovery unit 72, a descrambler 74, a serial-to-parallel converter 76 and a data sink 78. It will be understood that the data source 66 and data sink 78 merely represent a source of data to be transmitted onto the backplane and a destination of data received from the backplane. Data signals are typically received from the data source 66 in bit-parallel form. While the data source 66 operates in parallel, the width of the parallel form is based on the best use of data processing technology. (8-, 16-, 32- and 64-bit-wide data paths are common.) The parallel-to-serial converter 68 operates in a conventional manner to produce a serial bit stream to be supplied to the scrambler 70.

Details of the scrambler 70 will be further discussed below, but, in simple terms, the scrambler 70 randomizes the data stream. Most data streams are not random and contain patterns that reflect of the nature of the data. Some real data streams often contain long unbroken sequences of a single binary state, or repetitive patterns of data, e.g., a clock signal which is a continuous 1010 . . . pattern. These sequences or patterns result in high levels of energy being radiated at certain narrow frequency bands, while much lower energy is radiated at other frequencies. Scrambling with a polynomial or pseudorandom code sequence transforms the bit stream to one in which there are virtually no repetitive patterns of data bits. The scrambled data stream has its radiated energy spread over a much broader band of frequencies, with the energy peaks reduced substantially.

The scrambled data stream is transmitted by bus transmitter 62 onto one of the backplane conductors 60, which emits reduced electromagnetic radiation as a result of the scrambled nature of the data stream. Data received from the backplane conductor 60 by bus receiver 64 must, of course, be descrambled before it can be further processed in the data sink 78. An additional advantage of using the scrambling technique is that a data clock signal can be recovered from the scrambled data signal using standard techniques and does not need to be separately transmitted on the backplane. A continuous stream of an unchanging binary data value, coded in a conventional nonreturn-to-zero (NRZ) format, would not contain a component at the data clock rate. Thus, operation of the descrambler 74 can be synchronized with the recovered data clock signals, to allow recovery of the original data stream.

The use of a scrambled data pattern requires that the transmitter and receiver be synchronized at the data level. That is, the receiver and transmitter must use appropriate polynomials with the appropriate starting, or "seed," values so that the encoded transmit data can be decoded accurately by the receiver. In order for this system to operate, two polynomials must be synchronized with respect to the seed values. Many systems exist for synchronization of the polynomials, one of which is the concept of "frame synchronism." In frame synchronism, the scrambled data is placed into a repetitive frame that is used to align the received and transmit polynomials.

One simple approach to frame synchronization, which is adopted in the preferred embodiment of the invention, is simply to transmit a non-scrambled frame header at the start of each frame of data. At the receiving end of the transmission, the frame header is detected and a frame pulse is generated to reset the descrambler 74 at the start of each new frame. The detection of frame headers can be implemented at any convenient point in the receiving apparatus, such as in the clock recovery circuit 72. Therefore the clock recovery circuit 72 preferable includes frame header detection circuit, which simply searches the incoming scrambled data stream for the unique pattern of the frame header, and then generates a frame pulse to reset the descrambler 74. If the data were not transmitted in frames, but in a continuous stream, some other technique would be needed to synchronize the descramnbling pseudorandom code sequence with the incoming data.

More specifically, in the presently preferred embodiment of the invention, the data source 66 organizes data into 53-byte cells of data and incorporates a mapping device that maps the data cells into a "payload" as defined for the Synchronous Optical Network (SONET). A complete specification of the SONET data payload and data cells may be obtained in Technical Reference TR-NWT-000253 (Issue 2, December 1991), entitled *Synchronous Optical Network (SONET) Transport Systems: Common Generic Criteria*, which is a module of *Transport Systems Generic Requirements* (TSGR), FR-NWT-000440, published by Bellcore, 60 New England Avenue, DSC 1B-252, Piscataway, N.J. 08854-4196. The SONET specification is hereby incorporated by reference into this specification. The scrambler 70 in the presently preferred embodiment of the invention is the SONET frame-synchronous ($X^7+X^6+1$) scrambler operating at line rate. As mentioned above, the scrambler 70 restarts synchronous with the SONET frame boundary. It is preloaded with a binary value 1111111 on receiving the most significant bit of the byte following the last frame boundary byte, which is the last of the bytes designated the C1 in the SONET specification. As will be further discussed, the SONET payload is combined with scrambler output via a modulo-2 addition, which is equivalent to an exclusive OR (XOR) operation. The bytes of the frame boundary, designated the A1, A2 and C1 bytes in the SONET specification, are not scrambled, so that they can be recognized by the descrambler 74 and used to synchronize descrambling operations.

Figure 6:
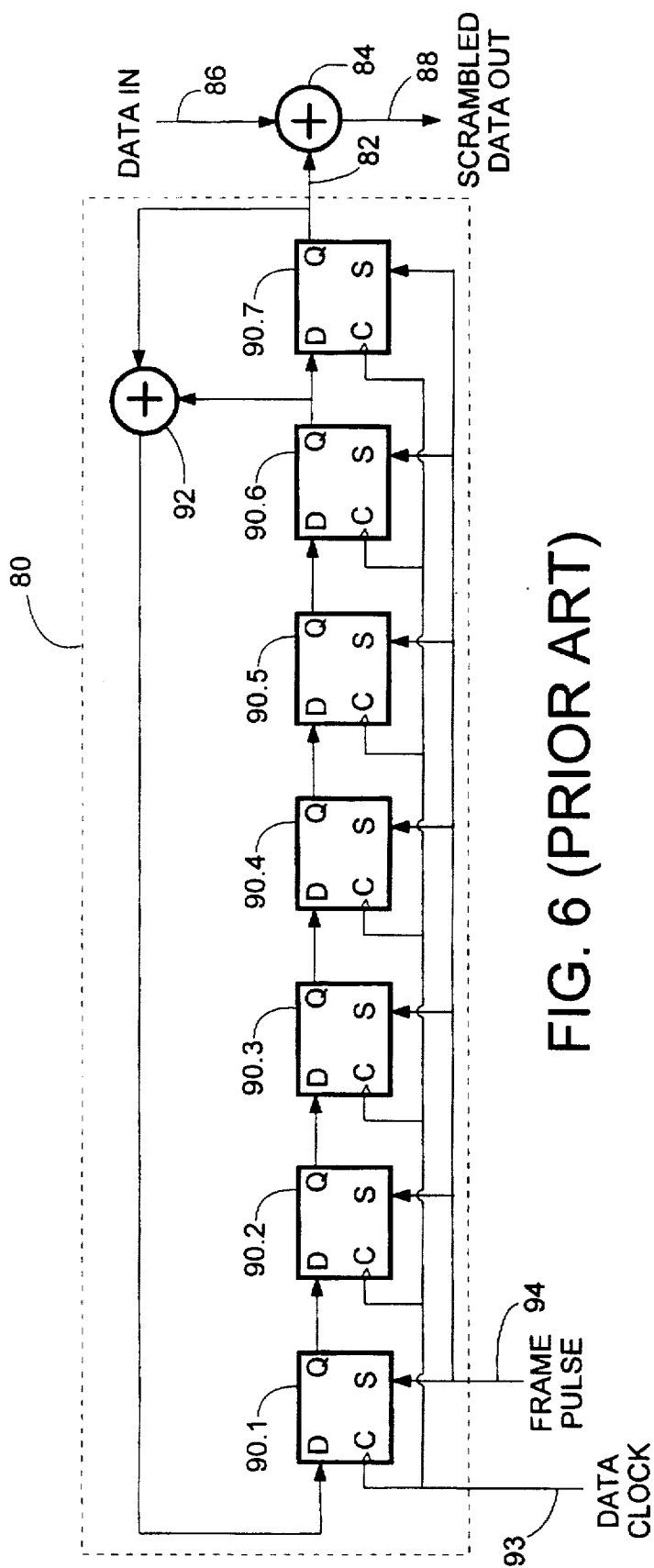
FIG. 6 is a block diagram of a prior art frame-synchronous data scrambler of a type that could be used in the system of the invention as shown in the block diagram of FIG. 4.

The SONET scrambler is shown in functional form in FIG. 6. It consists of a pseudorandom code generator 80 producing a pseudorandom code sequence on output line 82, and a modulo-2 adder 84 that combines the code sequence with a data input stream on line 86. A scrambled data stream is output on line 88. The modulo-2 adder 84 basically performs an exclusive OR (XOR) operation, producing a logical "1" output only if its two binary inputs are of different value. Thus, the scrambling operation complements (reverses) the binary data value if the output of the code sequence generator is a "1" and has no effect on the binary data value if the output of the code sequence generator is a "0."

The pseudorandom code generator 80 comprises seven D-type flip-flops, indicated at 90.1 through 90.7, respectively. Each flip-flop 90 has a D terminal for input of data, a Q terminal for output of data and a clock terminal C. When a clock pulse is applied to the C terminal, binary data is transferred from the D input to the Q output of each flip-flop. The flip-flops are connected in series, such that the Q output of flip-flop 90.1 is connected to the D input of the next flip-flop 90.2, and so forth. The last flipflop 90.7 has its Q output connected to the modulo-2 adder 84, and also as an input to a second modulo-2 adder 92. The Q output of the next-to-last flip-flop 90.6 is also connected as an input to the second modulo-2 adder 92. The output of this adder 92 is connected back to the D input of the first flip-flop 90.1. Data clock signals are applied to all the clock terminals of the flip-flops, over line 93. A frame pulse on line 94 is connected to S (set) terminals of all the flip-flops 90.

In operation, at the beginning of a data frame, the frame pulse on line 94 resets all the flip-flops 90 to a logical "1" value. As data clock pulses are applied to the code generator 80, initially a stream of "1s" emerges on line 82 and "0" bits are fed back to the D input of the first flip-flop 90.1. However, whenever there is a "0-1" or "1-0" combination in the last two flip-flops 90.6 and 90.7, a "1" is fed back to the first flip-flop 90.1. Although the code generator begins with an output of seven "1s" followed by an output of six "0s", after a number of additional data clock pulses, the output becomes more random in nature and does not repeat itself except over a long code sequence.

Figure 7:
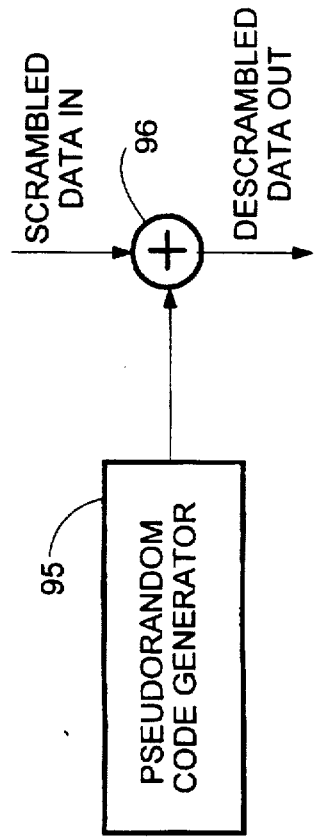
FIG. 7 is a block diagram of a prior art frame-synchronous data descrambler of a type that could be used in the system of the invention as shown in the block diagram of FIG. 4.

As shown in FIG. 7, descrambling involves the generation of the same code sequence with a pseudorandom generator 95, identical to the circuit 80. The descrambler 74 further includes another modulo-2 adder 96, which combines the output of the code generator 95 and the received data stream. Data clock pulses for the descrambler code generator 95 are derived from the clock recovery unit 72. Frame pulses are generated upon detection of a frame header in the incoming data. It will be recalled that the frame headers are not scrambled.

Figure 5A:
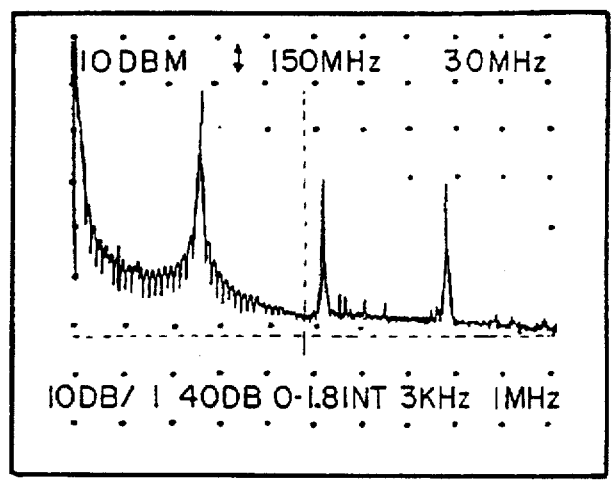
FIG. 5A is a graph showing the frequency spectrum of a typical nonscrambled data signal.
Figure 5B:
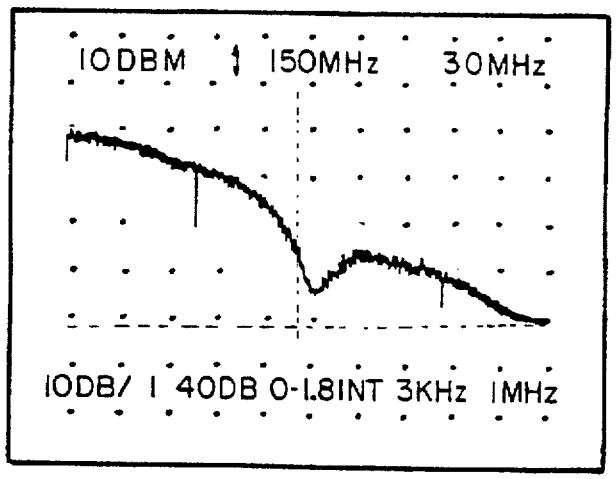
FIG. 5B is a graph similar to FIG. 5A, but showing the frequency spectrum when the data signal is scrambled.
Figure 5C:
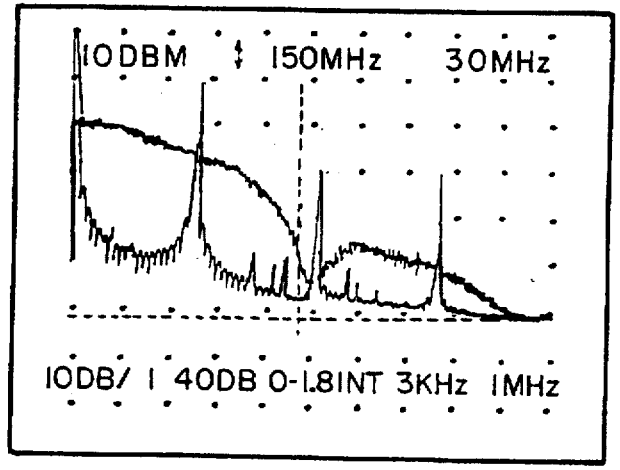
FIG. 5C is a graph showing FIGS. 5A and 5B together for comparison.

FIG. 5A shows a the spectrum of typical non-scrambled data in NRZ (non-return-to-zero) format, which means that binary data signals are encoded as a succession of two selected voltage levels. The data rate is 155.52 Mbits/s and the frequency range displayed is 0–300 MHZ. The vertical scale is 10 dB (decibels) per division, and it will be observed that there are large peaks of power at regular increments of frequency across the bandwidth analyzed. This is typical of the spectral content of non-random data. FIGS. 5B and 5C show the effect of data scrambling in accordance with the invention. The peaks of FIG. 5A are reduced by approximately 20 dB as a result of scrambling. Ideally, in the power spectrum there is a null at the frequency corresponding to the baud rate. (Details of this effect are well known and described in literature pertaining to NRZ encoding.) In this particular case, the null should be at 155.52 MHZ. However, FIGS. 5A, 5B and 5C show a frequency component at the baud rate. Poorly designed drivers could cause this component to be problematic, but otherwise its contributions to any radiated emissions will be small and containable.

It will be appreciated from the foregoing that the present invention represents a significant advance in the field communication system design, and more specifically in system backplane architectures. In particular, the invention provides a simple technique for reducing electromagnetic radiation from backplane structures used to interconnect communication modules. The invention permits greatly improved throughput over backplane structures. High data rates, e.g. 150 MHZ, can be achieved over a single backplane conductor without the need for costly shielding. It will also be appreciated that, although a specific embodiment of the invention has been described in detail for purposes of illustration, various modifications may be made without departing from the spirit an scope of the invention. For example, it will be understood that various other approaches may be used to scramble and descramble the data, within the scope of he invention. Accordingly, the invention should not be limited except as by the appended claims.

We claim:

1. A high speed backplane having reduced electromagnetic radiation, comprising:

at least one signal conductor for transmission of data;

at least one bus transmitter module for transmitting data signals onto said at least one signal conductor;

at least one bus receiver module for receiving data signals from said at least one signal conductor;

a scrambling device coupled to said bus transmitter module, for regulating electromagnetic radiation by scrambling data signals before transmission onto said at least one signal conductor; and a descrambling device coupled to said bus receiver module, for descrambling data signals received from said at least one signal conductor;

wherein said scrambling device is operable so as to scramble the data signals into scrambled signals characterized by having energy spread across a frequency spectrum resulting in lower electromagnetic radiation peaks in the backplane than those present in the transmission of unscrambled signals.

2. A high speed backplane as defined in claim 1, wherein:

said scrambling device operates in synchronism with a data clock signal and restarts its operation upon receipt of a data frame pulse identifying the start of a new frame of data to be transmitted.

3. A high speed backplane as defined in claim 2, and further comprising:

a clock recovery circuit associated with said bus receiver module, for recovering said data clock signal from said received scrambled data signals.

4. A high speed backplane as defined in claim 3, wherein said clock recovery circuit further comprises circuitry for detecting the start of a received data frame and generating a frame pulse therefrom.

5. A high speed backplane as defined in claim 1, and further comprising:

a parallel-to-serial converter coupled to said bus transmitter module and a serial-to-parallel converter coupled to said bus receiver module, whereby data signals are converted to a serial stream by said parallel-to-serial converter before said data signals are scrambled by said scrambling device, and said data signals are then converted back to parallel form by said serial-to-parallel converter after descrambling by said descrambling device.

6. A method for reducing electromagnetic radiation from a backplane interconnecting multiple communication modules, the method comprising the steps of:

providing a serial input data stream;

scrambling said serial input data stream by combining said stream with a pseudorandom code sequence;

transmitting said scrambled data stream onto a backplane conductor;

receiving said scrambled data stream from said backplane conductor; and, descrambling said received scrambled data stream;

wherein transmitting a scrambled data stream across said backplane conductor results in substantially reduced electromagnetic radiation from said backplane conductor than would result from transmitting an unscrambled data stream across said backplane conductor.

7. A method as defined in claim 6, and further including the steps of:

recovering a data clock signal from said scrambled data stream received from said backplane conductor;

detecting a frame boundary in said received scrambled data stream;

using said frame boundary to provide a descrambler reset signal; and using said recovered clock signal to control operation of a descrambler.

8. A method as defined in claim 6, wherein the scrambling step includes:

generating a first pseudorandom code sequence;

combining said first pseudorandom code sequence with said input data stream.

9. A method as defined in claim 8, wherein the descrambling step includes:

generating a second pseudorandom code sequence identical to said first pseudorandom code sequence; and combining said second pseudorandom code sequence with said received scrambled data stream, to recover said input data stream.

10. A method as defined in claim 6, and further including the step of:

converting a parallel form data stream to serial form before scrambling the date stream.

11. A method as defined in claim 6, and further including the step of:

converting a serial form data stream to parallel form after descrambling the data stream.

12. A backplane having reduced electromagnetic radiation, comprising:

at least one signal conductor for transmission of data;

at least one bus transmitter module for transmitting data signals onto said at least one signal conductor;

a scrambling device coupled to said bus transmitter module for regulating electromagnetic radiation by scrambling data signals before transmission onto said at least one signal conductor, wherein said scrambling device is operable so as to scramble the data signals into scrambled signals characterized by having energy spread across a frequency spectrum in such manner as to lower electromagnetic radiation peaks in the backplane relative to those present in an unscrambled transmission of said data signals.

13. A backplane as defined in claim 12, further comprising:

at least one bus receiver module for receiving data signals from said at least one signal conductor; and a descrambling device coupled to said bus receiver module for descrambling data signals received from said at least one signal conductor.

14. A method for reducing electromagnetic radiation from a backplane interconnected multiple communication modules, the method comprising the steps of:

providing a serial input data stream;

scrambling said data stream so that there are substantially no repetitive patterns of data bits in said data stream;

transmitting said scrambled data stream onto a backplane conductor.

wherein transmitting said scrambled data stream across said backplane conductor results in substantially reduced electromagnetic radiation from said backplane conductor than would result from transmitting an unscrambled data stream across said backplane conductor.

15. A method as defined in claim 14, wherein said scrambling step comprises:

combining said data stream with a pseudorandom code sequence to produce said scrambled data stream.

16. A method as defined in claim 14, wherein said transmitting step comprises:

transmitting said scrambled data in frames, each said frame having a non-scrambled frame header.

17. A method as defined in claim 16, and further including the steps of:

receiving said scrambled data stream from said backplane conductor;

recovering a data clock signal from said scrambled data stream;

detecting a frame boundary in said received scrambled data stream;

using said frame boundary to provide a descrambler reset signal;

using said recovered clock signal to control a descrambler; and descrambling said receiver scrambled data stream.

18. A method as defined in claim 14, and further including the steps of:

receiving said scrambled data stream from said backplane conductor; and, descrambling said received scrambled data stream.

19. A high speed interconnect having reduced electromagnetic radiation, the interconnect provided by a motherboard, the interconnect for connecting electronic equipment modules, comprising:

at least one signal conductor in the motherboard for transmission of data;

at least one bus transmitter module for transmitting data signals onto said at least one signal conductor;

at least one bus receiver module for receiving data signals from said at least one signal conductor;

a scrambling device coupled to said bus transmitter module for regulating electromagnetic radiation by scrambling data signals before transmission onto said at least one signal conductor; and a descrambling device coupled to said bus receiver module for descrambling data signals received from said at least one signal conductor;

wherein said scrambling device is operable so as to scramble the data signals into scrambled signals characterized by having energy spread across a frequency spectrum in such manner as to lower electromagnetic radiation peaks in the motherboard than those present in the transmission of unscrambled signals.

* * * * *